United States Patent Office 3,775,467
Patented Nov. 27, 1973

3,775,467
PROCESS FOR THE PRODUCTION OF ALKOXY ACETOACETIC ACID ESTERS
Erich Greth, Visp, Switzerland, assignor to Lonza Ltd., Gampel, Valais, Basel, Switzerland
No Drawing. Filed Aug. 31, 1972, Ser. No. 285,368
Claims priority, application Switzerland, Sept. 10, 1971, 13,277/71; Apr. 21, 1972, 5,916/72
Int. Cl. C07c *67/00*
U.S. Cl. 260—483     16 Claims

ABSTRACT OF THE DISCLOSURE

This invention involves a process of preparing γ-alkoxy-acetoacetic acid esters, having the formula:

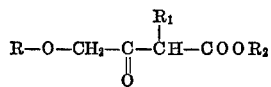

wherein R is a lower alkyl group having 1 to 10 carbon atoms, $R_1$ is a hydrogen atom or a lower alkyl group having 1 to 10 carbon atoms, and $R_2$ is a lower alkyl group having 1 to 10 carbon atoms. The process includes reacting a γ-halo-acetoacetic acid ester having the formula:

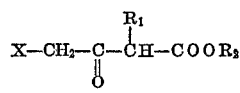

wherein $R_1$ and $R_2$ are as defined above, and X is a halogen atom, with an alkali alcoholate, having the formula:

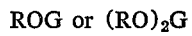

where R is defined as above, and G is an alkali moiety. The alkali alcoholate has first been dissolved in an alcohol. The molar ratio of the alkali alcoholate to the γ-halo-acetoacetic acid ester is at least 2. The reaction can be conducted in the presence of an aprotic solvent, such as, dimethyl sulfoxide.

BACKGROUND OF THIS INVENTION

(1) Field of this invention

This invention relates to a process for the production of γ-alkoxy acetoacetic acid esters.

(2) Prior art

γ-Ethoxy acetoacetic ester can be produced by reaction of bromoacetic acid ester and ethoxy acetic acid ester can be produced by condensation of methoxyacetyl ciety 68 (1946) 2392] or by reaction of ethoxy acid ester with acetic acid ester in the presence of sodium [Chemical Abstracts 43 (1949) 2625e]. 4-methoxy acetoacetic etser can be produced by condensation of methoxyacetyl chloride with malonic acid-ethyl-tert.-butyl ester, followed by saponification and decarboxylation [Journal of the American Chemical Society 70 (1948), p. 500]. The product yields achieved according to the above processes are about 11, 21 and 40 percent, respectively.

Reported experiments for the production of γ-ethoxy acetoacetic acid ester from γ-chloroacetoacetic acid ester with equimolar quantities of sodium alcoholates were a failure; instead of the expected γ-ethoxy acetoacetic acid ester, succinylosuccinic acid ester was obtained [Bulletin of the French Chemical Society (4) 29 (1921), p. 402].

BROAD DESCRIPTION OF THIS INVENTION

An object of the invention is to produce a γ-alkoxy acetoacetic acid ester, which heretofore was difficult to obtain, by means of a process which results in high yields and which is relatively easy and simple in execution.

This invention involves a process of preparing γ-alkoxy-acetoacetic acid esters, having the formula:

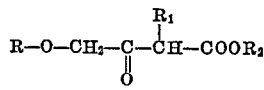

wherein R is a lower alkyl group having 1 to 10 carbon atoms, $R_1$ is a hydrogen atom or a lower alkyl group having 1 to 10 carbon atoms, and $R_2$ is a lower alkyl group having 1 to 10 carbon atoms. The process includes reacting a γ-halo-acetoacetic acid ester having the formula:

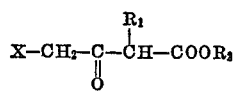

wherein $R_1$ and $R_2$ are as defined above, and X is a halogen atom, with an alkali alcoholate, having the formula:

where R is defined as above, and G is alkali moiety. The alkali alcoholate has first been dissolved in an alcohol. The molar ratio of the alkali alcoholate to the γ-halo-acetoacetic acid ester is at least 2.

The reaction is preferably conducted also in the presence of an aprotic solvent, such as dimethyl sulfoxide.

The product can be isolated from the reaction admixture or mass by any convenient means.

When aprotic solvents are used, colorless to light yellow raw products are obtained; when aprotic solvents are not used, raw products of a dark color are obtained. When aprotic solvents and alcohol are used, yields greater than 96 percent or so are obtained. Very high yields are also obtained when only the alcohol is used.

DETAILED DESCRIPTION OF THIS INVENTION

The reaction is preferably conducted at a temperature between 15° and 30° C., but higher and lower temperatures can readily be used.

The alcohol can be any aliphatic alcohol, such as, 1-pentadecanol and 1-dodecanol. The alcohol can be straight chained or branched. Preferably the alcohol is an aliphatic alcohol containing from 1 to 10 carbon atoms. Examples of the preferred alcohols are: methanol, ethanol, butanol, secondary butanol, propanol, isopropanol, isobutanol, tert.-butanol, 1-pentanol, isooamyl alcohol, 2-methyl-1-butanol, neopentanol, 2-pentanol, 3-pentanol, 3-methyl-2-butanol, 1-hexanol, 2-methyl-2-butanol, 3-methyl-1-pentanol, isohexanol, 3-methyl-1-pentanol, t-amylcarbinol, 2-ethyl-1-butanol, 2-hexanol, 2,3-dimethyl-1-butanol, 3-hexanol, 3-methyl-2-pentanol, n-heptanol, 2,3,3-trimethyl-2-butanol, 1-octanol, 1-nonanol and 1-decanol.

Preferably an excess of alcohol is used.

The reaction is preferably conducted also in the presence of an aprotic solvent. Aprotic solvents are defined in Monograph 105 of the National Bureau of Standards. Aprotic solvents are almost devoid of acidic or basic properties, for example, aprotic solvents do not interact strongly with acidic solutes, such as, carboxylic acids, phenols, and mineral acids, or with basic solutes such as, amines and derivatives of guanidine or pyridine. They are comparatively inert in character. Indifferent solvents or inert solvents are other names for aprotic solvents. In general, aprotic solvents are organic compounds.

There are generally two classes of aprotic solvents. The most preferred class of aprotic solvents are termed dipolar aprotic solvents and generally have a high dielectric constant ($\epsilon$) that ranges from about 21 to about 46.5. The preferred aprotic solvent is dimethyl sulfoxide ($\epsilon$=46). Examples of other aprotic solvents in this class are, nitrobenzene, methyl sulfoxide, benzonitrile, dimethylacetamide, dimethylformamide, sulfolane (tetramethylenesulfone) N-methyl formamide, formamide, N-methyl propionamide, and mixtures thereof.

A second class of aprotic solvents generally have a dielectric constant in ther ange of about 2 to about 10. The aprotic solvents of this class generally are aliphatic hydrocarbons, aromatic hydrocarbons, and halogenated hydrocarbons. Such hydrocarbons can be saturated or unsaturated. Examples of such aprotic solvents are benzene, toluene, cyclohexlane, o-xylene, m-xylene, p-xylene, 2,2,4-trimethylpentane, mesitylene, decahydronaphthalene, phenylacetylene, tetrahydronaphthalene, chlorobenzene, and o-dichlorobenzene.

Examples of mixtures of aprotic solvents are benzene-dimethylsulfoxide, benzene-dimethylformamide, o-xylene-sulfolan and toluol-dimethylacetamide.

Most preferably the aprotic solvent is used in a quantity which corresponds in volume to that of the alcohol being used. The quantity of aprotic solvent generally depends upon the solubility of the alkali alcoholate in the corresponding alcohol. Preferably the volume of the aprotic solvent or solvents is never much below the volume of the alcohol.

The term alkali as used herein, means the alkali metals, such as, potassium (preferred), sodium (preferred), lithium, rubidium, cesium and francium, the alkaline earth metals, such as, barium, calcium, strontium, radium and magnesium. The preferred alkali is sodium.

At least 2 moles of alkaline alcoholate per mole of γ-halo-acetoacetic acid ester are used, with molar ratios such as 10 to 1, 15 to 1, and higher ratios being quite useful. Preferably between 2.5 and 5.0 moles of alkali alcoholate per mole of γ-halo-acetoacetic acid ester are used.

Examples of useful alkali alcoholates are sodium methoxide, sodium ethoxide, sodium pentoxide, barium ethoxide, calcium methoxide, magnesium methoxide, magnesium ethoxide, potassium methoxide, sodium isobutoxide, sodium 1-decoxide, barium propoxide, sodium isohexoxide, barium butoxide, sodium n-heptoxide, calcium propoxide, sodium propoxide, calcium pentoxide, potassium isopropoxide, potassium isoamoxide, lithium ethoxide and potassium 2-methyl-1-pentoxide.

The alkali alcoholate can be prepared using any convenient method. Alkalis, e.g., sodium, potassium and magnesium, react with methanol to give alkali methoxides. Most alkalis, e.g., sodium, barium and calcium, react with ethanol to form alkali ethoxides. In general, alkalis react with alcohols to form alkali alcoholates.

R, $R_1$ and $R_2$ can be lower alkyl groups containing one to 10 carbon atoms and can be straight chain or branch chain alkyl groups. Examples of useful alkyl groups which R, $R_1$ and $R_2$ can be are: methyl, ethyl, n-propyl, isopropyl, n-butyl, isobutyl, n-pentyl, isopentyl, n-hexyl, n-heptyl, n-octyl, n-nonyl, n-decyl, neo-pentyl, 2,4-dimethyl-3-pentyl, 2-heptyl, 3-heptyl, 2-methyl-2-heptyl, 3-methyl-2-heptyl, 4-heptyl, 2,6-dimethyl-4-heptyl, 4-ethyl-4-heptyl, 2-methyl-1-heptyl, 4-methyl-4-heptyl, 3-methyl-1-heptyl, 4-propyl-4-heptyl, 4-methyl-1-heptyl, 2,2,3,3-tetramethyl butyl, 2,3-dimethyl pentyl, 2,2,4-trimethylpentyl, 2,4-dimethyl-3-ethyl-3-hexyl, 2-ethyl-hexyl, 2-butyl, t.-butyl, 2-methyl-1-butyl, 2-pentyl, 3-pentyl, 3-methyl-2-butyl, 2-methyl-2-butyl, 2-methyl-1-pentyl, 3-methyl-1-pentyl, 4-methyl-1-pentyl, 2-ethyl-1-butyl, t-amyl, 2,3-dimethyl-1-butyl, 2-hexyl, 3-hexyl, 3-methyl-2-pentyl, 2,2-dimethyl-3-butyl, 4-methyl-2-pentyl, 2,3-dimethyl-2-butyl, 2-methyl-3-pentyl, and 3-methyl-3-pentyl and 2-methyl-2-pentyl.

X can be chlorine, bromine, fluorine or iodine. X is preferably bromine and most preferably chlorine.

Examples of useful γ-halo-acetoacetic acid esters, where $R_1$ is a hydrogen atom, are the methyl ester of γ-chloroacetoacetic acid, the ethyl ester of γ-chloroacetoacetic acid, the n-propyl ester of γ-chloroacetoacetic acid, the isopropyl ester of γ-chloroacetoacetic acid, the n-butyl ester of γ-chloroacetoacetic acid, the isopentyl ester of γ-chloroacetoacetic acid, the n-hexyl ester of γ-chloroacetoacetic acid, the n-decyl ester of γ-chloroacetoacetic acid, the 4-methyl-1-heptyl ester of γ-chloroacetoacetic acid, the 2,3-dimethyl-1-butyl ester of γ-chloroacetoacetic acid, the methyl ester of γ-bromoacetoacetic acid, the ethyl ester of γ-bromoacetoacetic acid, the n-propyl ester of γ-bromoacetoacetic acid, the n-hexyl ester of γ-bromoacetoacetic acid, the isopropyl ester of γ-bromoacetoacetic acid, the isohexyl ester of γ-bromoacetoacetic acid, the ethyl ester of γ-fluoroacetoacetic acid, and the ethyl ester of γ-iodoacetoacetic acid.

Examples of useful γ-halo-acetoacetic acid esters, where $R_1$ is an alkyl group, are the ethyl ester of α-methyl-γ-chloroacetoacetic acid, the methyl ester of α-ethyl-γ-chloroacetoacetic acid, the methyl ester of α-isopropyl-γ-chloro-acetoacetic acid, the propyl ester of α-butyl-γ-chloro-acetoacetic acid, the ethyl ester of α-ethyl-γ-bromo-acetoacetic acid, and the ethyl ester of α-heptyl-γ-bromo-acetoacetic acid.

The process of this invention is particularly suitable for the production of γ-alkoxy acetoacetic acid esters in which the γ-alkoxy group and the alcohol group of the esters are the same. When the process is applied to the production of γ-alkoxy acetoacetic acid esters in which the γ-alkoxy group is different from the alcohol group of the ester, ester mixtures are obtained by re-esterification. Thus, for example, in the case of the reaction of the ethyl ester of γ-chloroacetoacetic acid with sodium methylate in methanol, a mixture of the methyl ester of γ-methoxy-acetoacetic acid (main component), the ethyl ester of γ-methoxy-acetoacetic acid, the ethyl ester of γ-ethoxy-acetoacetic acid and the methyl ester of γ-ethoxy-aceto-acetic acid results.

The product can be isolated from the reaction admixture or mass by any convenient means. Example 1 presents such a typical convenient means.

The following examples illustrate this invention. In the examples and the rest of this application, all percentages, parts and ratios are on a weight basis unless otherwise stated or obvious to one ordinarily skilled in the art.

EXAMPLE 1

The ethyl ester of γ-ethoxy acetoacetic acid 4.20 gm. of sodium (0.182 mole) were dissolved under nitrogen in 50 ml. of absolute ethanol. The solution was mixed with 50 ml. of dimethyl sulfoxide. The admixture was mixed, at 20° C. with outside cooling, while stirring, with 11.88 gm. (0.0722 mole) of the ethyl ester of γ-chloroacetoacetic acid. (The ethyl ester of γ-chloroacetoacetic acid was produced according to Swiss Pat. No. 492,670.) After 48 hours at 20 to 25° C., the reaction solution was poured into 10 ml. of concentrated hydrochloric acid and 200 ml. of water. The admixture was extracted three times with methylene chloride (50 ml. each time). The methylene chloride was distilled off to yield 12.26 gm. of the ethyl ester of γ-ethoxy acetoacetic acid. The yield of the product ($C_8H_{14}O_4$) was 97.5 percent. The boiling point of the product was 106° C. (at 11 torr); the boiling point from the literature was 105° to 106° C. (at 11 torr). The melting point of the copper complex of the product was 142° to 144° C.; the melting point from the literature was 143° C. An analysis of the product was:

Found (percent): C, 54.7; H, 8.2; O, 37.1 (by difference). Calc. (percent): C, 55.16; H, 8.10; O, 36.74 (by difference). The molecular weight of the product found by mass spectrum was 174 and the calculated molecular weight was 174.2.

EXAMPLE 2

The methyl ester of γ-methoxy acetoacetic acid 5.75 gm. of sodium (0.250 mole) were dissolved under nitrogen in 50 ml. of methanol. The solution was treated with 50 ml. of dimethyl sulfoxide. The admixture, at 20° C. with outside cooling and while being stirred, was treated with 14.67 gm. of the methyl ester of γ-chloro-acetoacetic acid (0.0975 mole). After 48 hours at 20°

C., the admixture was poured into 15 ml. of concentrated hydrochloric acid and 200 ml. of water. The admixture was extracted six times with methylene chloride (50 ml. each time). The methylene chloride was distilled off to yield 13.97 of the methyl ester of γ-methoxy acetoacetic acid. The boiling point of the product was 113° C. (at 26 torr). The yield of the product ($C_6H_{10}O_4$) was 98.0 percent. An analysis of the product was:

Found (percent): C, 48.8; H, 6.9; O, 44.3. Calc. (percent): C, 49.31; H, 6.90; O, 43.79.

EXAMPLE 3

The isopropyl ester of γ-isopropyloxy acetoacetic acid 5.75 gm. of sodium (0.25 mole) were dissolved in 100 ml. of isopropanol at reflux temperature. The solution was treated with 100 ml. of dimethyl sulfoxide. 50 ml. of isopropanol were distilled off and the remaining solution (at 20° C.) was treated with 17.46 gm. of the isopropyl ester of γ-chloroacetoacetic acid (0.0978 mole). After 72 hours, the admixture was poured (at 20° C.) into 15 ml. of concentrated hydrochloric acid and 200 ml. of water. The admixture was extracted three times with methylene chloride. The methylene chloride was distilled off to yield 19.01 gm. of the isopropyl ester of γ-isopropyloxy acetoacetic acid. The yield was 96.1 percent. The product had a boiling point of 62° C. (at 0.05 torr). An analysis of the product ($C_{10}H_{18}O_4$) was:

Found (percent): C, 58.8; H, 8.8; O, 32.4. Calcd. (percent): C, 59.39; H, 8.97; O, 31.64.

EXAMPLES 4 TO 7

Example 1 was repeated four times except that the reaction was conducted at 5°, 15°, 30° and 45° C., respectively. In each case product in high yield and of high purity was obtained.

EXAMPLES 8 TO 10

Examples 1 to 3 were repeated except that the dimethyl sulfoxide was not used in each example. In each case product in high yield and of high purity was obtained.

EXAMPLES 11 AND 12

Example 1 was repeated twice except that 25 and 75 ml. of dimethyl sulfoxide were used, respectively. In each case product in high yield and of high purity was obtained.

EXAMPLE 13

Example 1 was repeated except that the molar ratio of sodium ethoxide to γ-chloro-acetoacetic acid ester was 8 to 1. Product of high purity and in high yield was obtained.

EXAMPLE 14

The octylester of γ-octyl acetoacetic acid 18 gm. sodium hydride (0.75 mole) were treated under nitrogen dissolved in 300 ml. of dimethyl sulfoxide with 132.5 gm. octanol (1.0 mole) at 80° C. After cooling to room temperature 63.2 gm. octylester of γ-chloro-acetoacetic acid (0.255 mole) were charged by drops. After 24 hours the admixture was poured into 50 ml. of concentrated hydrochloric acid and 600 ml. of ice water. The pH was brought with sodium hydroxide to 7 and the admixture was extracted three times with methylene chloride. After the methylene chloride was distilled off the octanol was distilled off at 60° C. and 0.01 mm. Hg. The residue was octylester of γ-octyl acetoacetic acid (81.2%) and octanol (18.8%). The yield was 97.34%. An analysis of the Cu-complex of the product ($C_{40}H_{74}O_8Cu$) with melting point 47.0–47.5° C. was:

Found (percent): C, 64.2; H, 9.5; O, 17.7; Cu, 8.3. Calcd. (percent): C, 64.35; H, 9.99; O, 17.14; Cu, 8.51.

EXAMPLE 15

The ethylester of γ-phenoxy acetoacetic acid 27.5 gm. of sodium hydride (1.15 mole) were dissolved under nitrogen in 300 ml. dimethyl sulfoxide and the admixture was treated with outside cooling with 84.69 gm. phenol (0.30 mole) dissolved in 150 ml. dimethyl sulfoxide.

To the admixture under outside cooling with ice water 49.10 gm. ethyl ester of γ-chloro-acetoacetic acid dissolved in 50 ml. dimethyl sulfoxide were charged by drops. After 24 hours the admixture was poured into ice water and the pH was brought to 7 with diluted phosphoric acid. The admixture was extracted three times with methylene chloride. The methylene chloride was distilled off to yield 140 gm. of a mixture containing phenol and ethylester of γ-phenoxy acetoacetic acid. After distilling the mixture at 123–125° C. at 0.5 mm. Hg 51.8 gm. pure ethylester of γ-phenoxy acetoacetic acid was obtained, yield 78.0%. Analysis of the Cu-complex ($C_{24}H_{26}O_8Cu$) with melting point 164–165.5° C.:

Found (percent): C, 56.4; H, 4.9; O, 24.4; Cu, 12.7. Calcd. (percent): C, 56.97; H, 5.18; O, 25.30; Cu, 12.56.

What is claimed is:

1. The process of preparing γ-alkoxy-acetoacetic acid esters, having the formula:

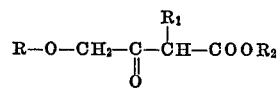

wherein R is a lower alkyl group having 1 to 10 carbon atoms, $R_1$ is a hydrogen atom or a lower alkyl group having 1 to 10 carbon atoms, and $R_2$ is a lower alkyl group having 1 to 10 carbon atoms, which comprises reacting at a temperature of 5°–45° C. an ester of γ-halo-acetoacetic acid having the formula:

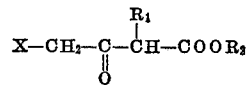

wherein $R_1$ and $R_2$ are as defined above, and X is a halogen atom, with an alkali alcoholate, having the formula:

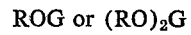

where R is defined as above, and G is an alkali or alkaline earth metal, said alkali alcoholate having been dissolved in an alkanol, and the molar ratio of said alkali alcoholate to said γ-halo-acetoacetic acid ester being at least 2.

2. The process as described in claim 1 wherein the reaction is conducted at a temperature between 15° and 30° C.

3. The process as described in claim 1 wherein the reaction is conducted in the presence of at least one aprotic solvent.

4. The process as described in claim 3 wherein said aprotic solvent is dimethyl sulfoxide, dimethyl formamide, formamide, N-methyl formamide or N-methyl propionamide.

5. The process as described in claim 4 wherein said aprotic solvent is dimethyl sulfoxide.

6. The process as described in claim 3 wherein approximately equal volumes of alkanol and aprotic solvent are used.

7. The process as described in claim 1 wherein said alkanol is an alkanol containing 1 to 10 carbon atoms.

8. The process as described in claim 7 wherein said alcohol is ethanol, methanol, isopropanol, propanol, butanol or secondary butanol.

9. The process as described in claim 1 wherein between 2.5 and 5 moles of said alkali alcoholate are used per mole of γ-halo-acetoacetic acid ester.

10. The process as described in claim 1 wherein G is potassium or sodium.

11. The process as described in claim 1 wherein $x$ is bromine or chlorine.

12. The process as described in claim 1 wherein said ester of γ-halo-acetoacetic acid is the ethyl ester of γ-chloro-aceto-acetic acid.

13. The process as described in claim 1 wherein said ester of γ-halo-acetoacetic acid is the methyl ester of γ-chloroacetoacetic acid.

14. The process as described in claim 1 wherein said ester of γ-halo-acetoacetic acid is the isopropyl ester of γ-chloroacetoacetic acid.

15. The process as described in claim 1 wherein the γ-alkoxy group and the alcohol group of the ester are the same.

16. The process as described in claim 1 wherein the resultant γ-alkoxy-acetoacetic acid ester is isolated from the reaction admixture.

References Cited

Sommelet et al. Bull. French Chem. Soc. (4), 29, 1921, pp. 402–406.

VIVIAN GARNER, Primary Examiner

U.S. Cl. X.R.

260—468 R